Patented July 29, 1952

2,604,668

UNITED STATES PATENT OFFICE 2,604,668

PACKAGING FILMS AND PROCESS OF MANUFACTURING SAME

Verle A. Miller, Wadsworth, and Robert J. Reid, Canal Fulton, Ohio, assignors to The Firestone Tire & Rubber Company, Akron, Ohio, a corporation of Ohio No Drawing. Application April 12, 1949, Serial No. 87,127

14 Claims. (Cl. 18—57)

This invention relates to novel packaging, wrapping and like thin, flexible self-supporting films of copolymers of butadiene and methacrylic acid, and to the manufacture thereof. By the term "films" as hereinafter used, it is desired to signify thin, flexible self-supporting pellicles varying in thickness from about .005 inch to .003 inch, and having sufficient pliability and flexibility to permit the use of same for the wrapping of various commodities.

A number of materials have been proposed for the fabrication into flexible films for packaging purposes. However, none of these films, with the exception of the cellulosic, vinyl and rubber hydrochloride films, have entered into any extensive commercial production. These films leave much to be desired for special purposes; for instance, in none of these films is there combined any high degree of extensibility with a desirable rate of vapor transpiration for the packaging of fruits and other like commodities. Accordingly, there exists a considerable field for the introduction of novel wrapping and like films having unique and desirable properties.

A patent to Hagedorn, 2,045,080, suggests the formation, inter alia, of films and the like from salts of acrylic and maleic polymers and copolymers. However these products had rather unfavorable properties and do not seem to have found technical application.

Accordingly, it is an object of this invention to provide novel and useful wrapping films.

Another object is to provide such films from copolymers of butadiene and methacrylic acid.

A further object is to provide such films which will have a desirable moisture transpiration rate coupled with a high degree of tensile strength and ability to be elongated without rupture.

A still further, and more specific object is to increase the mechanical strength of films of the aforementioned type.

Yet another object is to provide such films which may be produced by a simple process from cheaply and readily procurable starting materials.

SYNOPSIS OF THE INVENTION

The above and other objects are secured, in accordance with this invention, in films which are constituted of copolymers of butadiene with methacrylic acid, the butadiene comprising from 40% to 80% of the weight of such copolymers, and the methacrylic acid comprising the remainder. Such films may be produced by flowing a solution of the copolymer onto a suitable casting surface to the desired depth, evaporating the solvent from the film, and stripping the film from the casting surface. The resultant film has excellent strength, pliability and extensibility.

THE COPOLYMERS OF BUTADIENE AND METHACRYLIC ACID

As set forth above, the copolymers employed as base materials for the films of this invention contain from 40% to 80% (in this instance, and also hereinafter in this specification, percentages will be given on the total weight of the copolymer), of butadiene, the balance being methacrylic acid. Lesser percentages of butadiene result in undue brittleness in the films; higher percentages result in films which have more or less rubbery properties, rather than the inelastic extensibility desired in wrapping films. Such copolymers may conveniently be made by any of the techniques used in preparing copolymers of butadiene in the synthetic rubber industry. Such processes involve emulsifying the butadiene and methacrylic acid in the desired proportions in water, introducing a free radical-generating catalyst, and permitting the polymerization reaction to proceed. In order to obtain free acid groups in the polymer, the polymerization medium should be maintained on the acid side. Therefore it will be understood that non-ionic emulsifiers, or cationic emulsifiers or anionic emulsifiers which can be used in acidic systems, should be employed in the preparation of these preferred copolymers. Cationic emulsifiers which may be used include salts of organic amines containing from 8 to 30 carbon atoms such as dodecyl amine salts; 1-hydroxyethyl-2-heptadecenyl glyoxalidine salts, quaternary ammonium salts, and the like. Other cationic emulsifiers are exemplified in the salts of polyamines which have been amidified on one of their amine groups by a fatty acid containing from 8 to 22 carbon atoms, e. g., the so-called "Sapamines."

Suitable non-ionic emulsifiers include the ethers and esters of polyglycols, saccharans etc. with organic fatty groups containing from 8 to 22 carbon atoms. Anionic emulsifiers which can be used in acid aqueous systems include the hydrocarbon sodium sulfates and sulfonates, the monosulfated fatty partial glycerides, and the like, all containing hydrocarbon groups of from 8 to 22 carbon atoms. The polymerization reaction may be promoted by the addition of free-radical-yielding catalysts such as the alkali persulfates, percarbonates, perborates and the like, organic peracids such as benzoyl peroxide, acetyl peroxide, and the like, and alkyl peroxides such as di-t-butyl peroxide. The polymerization mass may also contain small amounts of the sulfhydryl-group-containing compounds termed "modifiers" in the synthetic rubber industry, such as alkyl mercaptans containing from 1 to 22 carbon atoms, e. g., n-dodecyl mercaptan, the commercially available mixed tertiary mercaptans containing from 12 to 16 carbon atoms, thiophenol, α- and β-thionaphthol and the like.

Upon completion of the polymerization, the copolymer may be recovered from the resultant latex by coagulation, by treatment with methanol or other water-miscible organic solvent or, where the copolymer contains 70% or less of butadiene in a cationic emulsified system, by treatment with salts.

THE FILM CASTING STEP

The process of casting the copolymers into films in accordance with this invention may be effected by dissolving the copolymers in a suitable solvent to form a casting solution, spreading the solution upon a smooth surface to the depth of a few hundredths of an inch, removing the solvent by evaporation, and stripping the resultant film, which will have a thickness of from .005 inch to .003 inch, from the casting surface. As solvents there may be employed any organic solvents for the copolymers having fair rate of evaporation at temperatures from 50° C. to 150° C., preferred solvents of this type being the dialkyl ketones containing from 3 to 7 carbon atoms such as acetone, methyl ethyl ketone, methyl isopropyl ketone, ethyl butyl ketone and the like; of the volatile aromatic hydrocarbon solvents such as benzene, toluene, the xylenes etc. when the higher butadiene ratios are employed. In some cases, where the copolymers are less readily soluble, it may be desirable to use mixtures of solvents, for instance a mixture of equal parts of acetone and toluene.

The casting solution may be made up in varying concentrations; usually concentrations from about 8% to about 25% will be found most suitable. The concentration of the solution, the depth of casting solution spread upon the casting surface, and the thickness of the final dried film (which last should be from .0005 inch to 0.01 inch) are mutually interdependent, the thickness of the dried film being approximately the same percentage of the depth of the freshly-cast solution, as the percentage of the copolymer present in the casting solution, based on the weight of the solution.

The solution may also contain various amounts of such stabilizing, moistureproofing, etc. ingredients as it may be desired to incorporate into the films. The films have excellent natural resistance to deterioration by actinic light and air, which resistance may be increased by the incorporation of alkylated phenolic compounds, sun-screening compositions such as the aryl salicylates, etc. Likewise the resistance of the films to the passage of moisture therethrough may be enhanced by the incorporation of waxes and other moistureproofing materials such as microcrystalline paraffin waxes, dialkyl ethers containing from 10 to 20 carbon atoms in the molecule, e. g. dicetyl ether, and the like.

TREATMENT OF THE FILMS WITH POLYVALENT METAL SALTS

As noted above, the properties of the films may be greatly improved, after casting, by converting the carboxylic acid groups therein to salt groups containing the cations of polyvalent metals. This is effected by first treating the film with aqueous alkali metal or ammonium hydroxides in a concentration range of from about 0.1% to 10.0%, based on the weight of solution, at temperatures between 0° C. and 100° C., preferably at about room temperature. The carboxylic acid groups in the copolymer thereby become converted to alkali metal or ammonium carboxylate groups, and the film quickly imbibes considerable amounts of water, as manifested by a swelling of the film. This swelling is an increasing function, up to a certain limit (which limit appears to indicate complete neutralization of the carboxylic acid groups) of the length of time during which the film is immersed. The limit to which the film swells is an inverse function of the concentration of the alkaline treating medium, apparently due to a salting-out effect. In general, immersion of the film in the alkaline treating bath for as short a time as one-half second will effect a sufficient conversion of the carboxylic acid groups therein to be of advantage; the conversion will be substantially complete within ten to twenty seconds. Longer times of immersion may be employed, but will effect little further change in the films. Reverting to the limit to which the completely neutralized film will swell, a film containing 60% of butadiene and 40% methacrylic acid will swell to about three times its original dimensions if the conversion is carried out in dilute (say 0.1%) alkaline solution but will swell to only about one-and-one-half its original dimensions in concentrated (say 10.0%) alkaline solution. In any case, the completely neutralized film will swell to about three times its original dimensions if immersed in plain water after the alkali treatment.

After treatment with the alkaline solution, the film is preferably, but not necessarily, passed through a bath of water to remove the surface clingage of alkaline solution. Thereafter the film is then immersed in an aqueous solution of a salt of a polyvalent metal, whereupon the alkali-metal-carboxylate groups in the copolymer become converted to the corresponding polyvalent metal carboxylic salt group. This conversion may be more or less complete, and in general, the conversion of as little as one-fourth of the carboxylic acid groups in the film to polyvalent metal carboxylic salt groups will be of distinct advantage. An immersion of approximately one-half second will suffice for this purpose. Conversion will be complete in from ten to twenty seconds. The treated film is at first gelatinous, but upon drying hardens rapidly, shrinks to approximately the original size and assumes a texture varying from parchment-like to softly draping, depending on the polyvalent metal employed and upon the ratio of butadiene to methacrylic acid in the copolymer, increasing proportions of the former tending to soften the drape of the film. The treated film has greatly increased strength and toughness, and loses the major portion of its thermoplasticity.

The salts of any polyvalent metals may be used to harden the films of this invention. Such metals include, for instance, calcium, magnesium, barium, mercury, tin, copper, iron, lead, strontium, nickel, cobalt and the like. The salts may be formed with any conveniently available anions, such as the chloride, sulfate, nitrate, acetate, formate, etc., the chief considerations being those of cost and of the solubility of the resultant salt. It is, of course, necessary that the metal salt shall be soluble in the aqueous treating medium, and the anion must be selected so that the resultant salt of the metal with which it is desired to treat the film will be soluble. Also, if the film is to be colorless, it is desirable to use a metal whose ions are colorless, such as calcium, magnesium, strontium, barium or mercury. The concentration of the salt solution may vary from about 0.25% to 25% based on the weight of solution.

The treated film may be used without further processing, or may be subjected to stretching to orient the copolymer molecules in the film. This stretching is performed while the film is in a plastic state: for instance, the film after treatment with alkali metal hydroxide, may be stretched, and held in stretched condition during the treatment with the polyvalent metal salt solution or may be stretched after treatment with the salt before the film is dried. The stretching may also be performed upon the dried film while in extensible state induced by heating to temperatures in the range 40° to 150° C. After treatment with the polyvalent metal salt and drying in the former cases, or cooling to room temperature in the latter case, the film will become set in the oriented condition, with the copolymer chains therein oriented in the direction of the stretching. The oriented film has considerably increased tensile strength, toughness and flex endurance as compared to the unoriented film. The stretching of the film may be done all in one direction, in which case the copolymer molecules will be oriented largely in the direction of the stretching. Alternatively the stretching may be carried out simultaneously in two directions at an angle to each other in the plane of the film, in which case the copolymer molecules will be oriented parallel to the surface of the film, and enhancement of the tensile properties will be observed in both lengthwise and widthwise directions in the film.

PROPERTIES AND USES OF THE FILMS

The films of this invention are chiefly useful as wrapping and packaging films. Before treatment with metallic salts, the films of this invention vary from rather hard, Celluloid-like pellicles in the case of the copolymers containing 40% butadiene and 60% methacrylic acid, to softly draping films in the case of the copolymers containing 80% butadiene and 20% methacrylic acid. In general, the films containing higher percentages of butadiene, i. e., 65% to 80% butadiene and 35% to 20% methacrylic acid are somewhat softer than is required for most applications, and are chiefly useful for conversion into harder films by treatment with polyvalent metal salts. However these softer films are useful in those cases where a somewhat more clinging wrap is desired. The tensile strength of the films of this invention before treatment with polyvalent metal salts is usually on the order of 3000 pounds per square inch.

As compared to the corresponding untreated films of this invention, the films which have been treated with polyvalent metal salts have considerably increased hardness and tensile strength, and diminished extensibility and flexibility. Before orientation they have tensile strengths on the order of 4000–6000 pounds per square inch. After orientation, they have tensile strengths on the order of 11,000 to 12,000 pounds per square inch.

All of the films of this invention have a moderate rate of moisture transmission, on the order of .5–2.0 grams per 100 square inches per 24 hour day at 25° C., with air at equilibrium with a 43.9% solution sulfuric acid in water on one side of the film and desiccated air on the other side. This value may be decreased, if desired, by incorporating suitable moistureproofing agents into the composition of the films. However, this moderate moisture transmission rate of the films may be quite desirable in many cases, as where it is desired to package fresh vegetables and the like.

The films of this invention are suitable for use in many applications. They may be used, for instance, in packaging foodstuffs (when packaging foodstuffs with metal-salt-treated films, it will be advisable to choose non-toxic salts, such as those of calcium, magnesium, iron and the like) such as cereals and breakfast foods, grains, frozen and fresh meats, vegetables, fruits and the like. The films may also be employed for the packaging of non-foodstuff commodities, such as machines and machine components, electrical components, and the like. Advantage may be taken of the presence of the polyvalent element in the film. For instance, films which have been hardened by treatment with mercury salts have excellent germicidal action. Films prepared with copper, mercury and similar toxic salts have excellent resistance to mildew and other fungus attack.

With the foregoing general discussion in mind, there are given herewith detailed examples of the practice of this invention. All parts given are by weight.

EXAMPLE I.—UNTREATED 60/40 BUTADIENE/METHACRYLIC ACID FILM—CATIONIC EMULSIFIER

A. *Preparation of copolymer*

| | Parts |
|---|---|
| Butadiene | 60 |
| Methacrylic acid | 40 |
| Water | 200 |
| 1-hydroxyethyl-2-heptadecenyl glyoxalidine hydrochloride (hydrochloric acid salt of "Cationic Amine 220" manufactured by the Carbide & Carbon Chemicals Corp.) | 8.3 |
| Dodecyl mercaptan | 1.0 |
| Potassium persulfate | 0.5 |

The above ingredients were placed in a closed reaction vessel and the ingredients agitated at 50° C. for 6 hours. .2 part of hydroquinone and 1 part of a non-staining antioxidant were added to the latex, the unpolymerized butadiene was then vented, and the latex coagulated by addition of methanol. The resultant precipitate was then thoroughly washed with water, and dried in the atmosphere at 70° C.

B. *Casting*

| | Parts |
|---|---|
| Copolymer of butadiene and methacrylic acid (prepared as just described) | 15 |
| Acetone | 85 |

The copolymer was dissolved in the acetone with agitation, and a film thereof cast upon a clear glass plate to a depth of .02 inch. The film was dried on the glass plate in an oven at 120° C. for 4 hours, then cooled to room temperature and stripped from the plate. The film was quite clear and transparent, and was admirably adapted for wrapping and packaging. Following are the properties of the film.

TABLE I

Tensile strength (pounds per sq. in.) _____ 3410
Elongation at break _____ 478%
Water vapor transmission [1] _____ 0.598 g./100 sq. in./hr.
Cold cracking temperature [2] _____ −32° C.
Folding endurance [3] _____ 14,671 cycles
Refractive index _____ 1.54

[1] Determined in a test at 25° C. with air in equilibrium with a 43.9% solution of sulfuric acid in water on one side of the film, and desiccated air on the other side.
[2] Determined as described in Modern Plastics, December 1946, page 165.
[3] Determined on an M. I. T. folding endurance tester.

EXAMPLE II.—UNTREATED 65/35 BUTADIENE-METHACRYLIC-ACID COPOLYMER FILM—CATIONIC AMINE EMULSIFIER

A film was prepared as described in Example I, with the exception that 65 parts of butadiene and 35 parts of methacrylic acid were employed, rather than the respective 60 and 40 parts of Example I, and a mixture of equal parts of toluene and acetone was used in place of the acetone casting solvent. The resultant film was somewhat softer and more extensible than the film of Example I.

EXAMPLE III.—UNTREATED 60/40 BUTADIENE COPOLYMER FILM — PARTIAL GLYCERIDE SULFATE EMULSIFIER

A. Preparation of copolymer

| | Parts |
|---|---|
| Butadiene | 60 |
| Methacrylic acid | 40 |
| Water | 200 |
| "Arctic Syntex M" (monosulfated monoglyceride of mixed higher fatty acids containing 12-14 carbon atoms manufactured by the Colgate-Palmolive-Peet Co.) | 1.6 |
| Potassium persulfate | 0.8 |
| Dodecyl mercaptan | 1.0 |

The above ingredients were agitated together in a polymerization vessel at 50° C. for 3 hours. The resultant latex was precipitated by addition of methanol, and the precipitate dewatered and washed on a filter and dried in the air at 70° C.

B. Casting

| | Parts |
|---|---|
| Copolymer prepared as just described | 15 |
| Toluene | 42 |
| Acetone | 43 |

The above ingredients were dissolved together and the resultant cement cast to a depth of .015 inch on a glass plate. The film was dried on the plate in an oven at 130° C., cooled to room temperature and stripped off from the casting surface. The resultant film was considerably harder-surfaced than the film of Example I, and had less draping ability than that film.

EXAMPLE IV.—UNTREATED 70/30 BUTADIENE/METHACRYLIC ACID FILM—CATIONIC EMULSIFIER

| | Parts |
|---|---|
| Butadiene | 70 |
| Methacrylic acid | 30 |
| Water | 200 |
| 1-hydroxyethyl-2-heptadecenyl glyoxalidine ("Cationic Amine 220" manufactured by the Carbide and Carbon Chemicals Corp.) | 7.5 |
| Hydrochloric acid (concentrated) | 2.5 |
| Dodecyl mercaptan | 1.0 |
| Potassium persulfate | 0.5 |

The hydrochloric acid and amine were mixed with the water and charged into a polymerization vessel. The remaining ingredients were then likewise charged, the vessel sealed, and the contents agitated at 50° C. for 5 hours, at the end of which time the polymerization reaction had proceeded to 85% of completion. The resultant latex was coagulated by addition of methanol, and the resultant crumb dewatered, washed with water, and dried at 70° C. The polymer was then dissolved in butyl acetate, to form a 15% solution, and cast upon a glass plate to a depth of 0.03 inch. The film on the plate was dried in an oven at 110° C. for 5 hours, and stripped off, yielding a transparent, flexible, self-sustaining film 0.004 inch thick.

EXAMPLE V.—UNTREATED 75/25 BUTADIENE-METHACRYLIC ACID—CATIONIC AMINE EMULSIFIER

The process of Example I was repeated, with the exception that 75 parts of butadiene and 25 parts of methacrylic acid were employed instead of the respective 60 and 40 parts of that example. The resultant films were rather soft and extensible for most packaging applications, and had some tendency toward blocking, although they were suitable for wrapping where a close drape of the film to the wrapped article is desired, as in stretch-wrapping.

EXAMPLE VI.—POLYVALENT METAL SALT TREATMENT

Portions of the film prepared as described in Example I were treated with various different polyvalent salts. In each case, the film was successively immersed in the following baths for the indicated lengths of time:

TABLE II

| Solution: | Time, seconds |
|---|---|
| 2% aqueous sodium hydroxide solution | 20 |
| Distilled water | 10 |
| .5 molal solution of the selected polyvalent metal salt | 30 |
| Distilled water | 10 |

The film was then dried in the air under slight tension. Tabulated herewith are the polyvalent metal salts used, and the properties of the resultant films.

TABLE III

| Salt Used | Properties of Treated Films |
|---|---|
| Barium Chloride | Quite flexible film, slightly extensible. |
| Calcium Chloride | Stiff, hard-surfaced film, inextensible. |
| Magnesium Chloride | Very flexible and limber film, slightly extensible. |
| Stannic Chloride | Very flexible film, slightly extensible. |
| Aluminum Chloride | Do. |
| Cadmium Acetate | Stiff, hard-surfaced film, inextensible. |
| Lead Nitrate | Do. |
| Mercuric Chloride | Do. |
| Zinc Chloride | Flexible, only slightly extensible. |
| Strontium Chloride | Do. |
| Nickel Diacetate | Stiff, hard film, only slightly extensible. |

The analyses (ash-content) of the above films indicated substantially quantitative conversion of the carboxylic groups to the metal salt groups.

EXAMPLE VII

To illustrate the compensation for hardness of a film by the employment of an inherently softer film base (higher in butadiene content) the film prepared in accordance with Example V was treated with mercuric chloride in accordance with the process of Example VI. The resultant film was much softer than the mercuric-salt-treated film of Example VI, being quite flexible, slightly extensible and in general substantially duplicating the properties of the barium-chloride-treated film of Example VI.

EXAMPLE VIII

A film prepared as described in Example II was treated with calcium chloride in accordance with the process described in Example VI. The resultant films had the following properties:

TABLE IV

| | |
|---|---|
| Tensile strength | 4625 pounds per square inch |
| Elongation at break | 63.5% |
| Cold crack temperature | −50° C. |
| Water vapor transmission | 0.872 gram per 100 square inches per 24 hours a day |

EXAMPLE IX.—ORIENTED PRODUCTS

The film prepared as described in Example VI by treatment with barium chloride, and the film prepared as described in Example VIII were hot-stretched by heating them to 120° C., elongating the films 250%, and cooling the films in stretched condition.

TABLE V

| Property | Film Treated With— | |
|---|---|---|
| | Barium Chloride | Calcium Chloride |
| Tensile Strength (Pounds per square inch) | 11,540 | 13,000 |
| Elongation at break_____percent | 50 | 47 |
| Cold crack temperature_____°C | 0 | |
| Water vapor transmission (grams per 100 square inches per 24 hours) | 0.598 | |
| Folding Endurance (cycles) (M. I. T. Folding Endurance Tester) | 5,000 | |

The above are the properties of the film obtained.

EXAMPLE X.—BEHAVIOR ON ALKALINE TREATMENT

In order to illustrate the effect of butadiene content and strength of alkali upon the swelling of the films during the alkaline solution treatment preparatory to the treatment with polyvalent salts, one-inch squares of each of the films of Examples I, II and IV were immersed in aqueous solutions containing 2% and 10% of potassium hydroxide, and the final surface area of the squares measured. Thereafter the films were transferred to distilled water baths, and the surface area after attainment of equilibrium again measured. Tabulated herewith are the results of these tests:

TABLE VI

| | Area of Film (square inches) | | | | |
|---|---|---|---|---|---|
| | Original | Swelled in 2% KOH | Swelled in 10% KOH | Swelled in 2% KOH, then water | Swelled in 10% KOH, then water |
| Film of Example I | 1 | 4 | 1.3 | 9 | 9 |
| Film of Example II | 1 | 2.25 | 1.1 | 4 | 4 |
| Film of Example IV | 1 | 2.0 | | 4 | 4 |

EXAMPLE XI.—ORIENTATION IN GELATINOUS CONDITION

A film prepared as described in Example I was immersed for 20 seconds in 2% potassium hydroxide solution, thereafter washed in water, and thereafter dipped in .5 molar solution of calcium chloride for 30 seconds. The film was then removed from the bath, and was initially in a rubbery condition. In this state, the film was stretched to 200% of its original length, and dried under tension sufficient to prevent retraction from this length. The resultant film had a tensile strength, in the direction of stretching, of 9500 pounds per square inch.

From the foregoing general discussion and detailed specific examples it will be evident that this invention provides novel wrapping and packaging films having unique combinations of properties not heretofore available in any given single wrapping film. The films are based upon the cheaply and readily available butadiene and methacrylic acid, and may be prepared by simple and inexpensive operative procedures.

What is claimed is:

1. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are polyvalent metal ions.

2. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are calcium ions.

3. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are barium ions.

4. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are mercury ions.

5. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are polyvalent metal ions, the molecules of the copolymer being oriented parallel to the surface of the film.

6. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are calcium ions, and the molecules of the copolymer being oriented lengthwise of the film.

7. A thin, flexible film having a thickness of from .0005 to 0.01 inch and essentially composed of a copolymer of butadiene and methacrylic acid, said copolymer containing from 40% to 80% of butadiene by weight, and the balance being methacrylic acid, the carboxylic acid radicals in said copolymer being converted to carboxylic salt groups of which the cations are barium ions, the molecules of the copolymer being oriented lengthwise of the film.

8. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, and thereafter contacting said film with an aqueous solution of a soluble polyvalent metal salt, the time of contact with said respective solutions being at least one-half second.

9. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, and thereafter contacting said film with an aqueous solution of a soluble calcium salt, the time of contact with said respective solutions being at least one-half second.

10. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, and thereafter contacting said film with an aqueous solution of a soluble barium salt, the time of contact with said respective solutions being at least one-half second.

11. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, and thereafter contacting said film with an aqueous solution of a soluble mercury salt, the time of contact with said respective solutions being at least one-half second.

12. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, contacting said film with an aqueous solution of a soluble polyvalent metal salt, the time of contact with said respective solutions being at least one-half second, heating said film, and stretching said film to from 100% to 300% to orient the molecules of said copolymer parallel to the surface of the film.

13. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, contacting said film with an aqueous solution of a soluble calcium salt, the time of contact with said respective solutions being at least one-half second, heating said film, and stretching said film to from 100% to 300% to orient the molecules of said copolymer parallel to the surface of the film.

14. Process which comprises forming a solution, in an organic solvent therefor, of a copolymer of butadiene and methacrylic acid containing from 40% to 80% of butadiene by weight, the balance being methacrylic acid, spreading said solution as a thin layer upon a smooth casting surface, drying said layer to form a film, stripping the film from said surface, contacting said film with an aqueous solution of an alkali metal hydroxide, contacting said film with an aqueous solution of a soluble barium salt, the time of contact with said respective solutions being at least one-half second, heating said film, and stretching said film to from 100% to 300% to orient the molecules of said copolymer parallel to the surface of the film.

VERLE A. MILLER.
ROBERT J. REID.

REFERENCES CITED

The following references are of record in the file of this patent:

UNITED STATES PATENTS

| Number | Name | Date |
| --- | --- | --- |
| 2,234,204 | Starkweather | Mar. 11, 1941 |
| 2,274,150 | Mack | Feb. 24, 1942 |